United States Patent [19]

Asakawa

[11] Patent Number: 4,978,979
[45] Date of Patent: Dec. 18, 1990

[54] WHEEL SUPPORTED CARRIAGE FOR A SCANNING PLOTTER

[75] Inventor: Stuart D. Asakawa, San Diego, Calif.

[73] Assignee: Hewlett-Packard Company, Palo Alto, Calif.

[21] Appl. No.: 389,026

[22] Filed: Aug. 3, 1989

[51] Int. Cl.⁵ .............................................. B41J 2/01
[52] U.S. Cl. ........................ 346/140 R; 346/139 R; 400/56
[58] Field of Search ............. 346/140, 139 R; 400/56, 400/59

[56] References Cited

U.S. PATENT DOCUMENTS

| | | | |
|---|---|---|---|
| 4,010,834 | 3/1977 | Linder | 400/56 |
| 4,364,067 | 12/1982 | Koto | 346/140 |
| 4,755,836 | 7/1988 | Ta | 346/140 |

FOREIGN PATENT DOCUMENTS 2902037  7/1980  Fed. Rep. of Germany.

Primary Examiner—Joseph W. Hartary
Attorney, Agent, or Firm—Roland I. Griffin

[57] ABSTRACT

A carriage for a scanning ink jet plotter has at least two roller supports which ride on the platen or on the drafting surface to maintain a constant spacing between an ink jet mounted on the carriage and the drafting surface to improve resolution of the plotted lines. A biasing spring may also be used the urge the roller supports into contact with the drafting surface for further enhanced resolution.

4 Claims, 3 Drawing Sheets

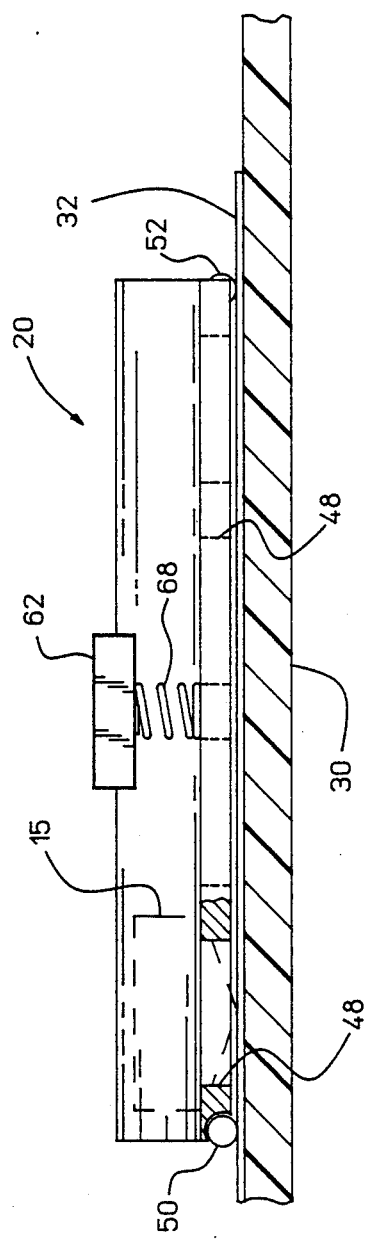
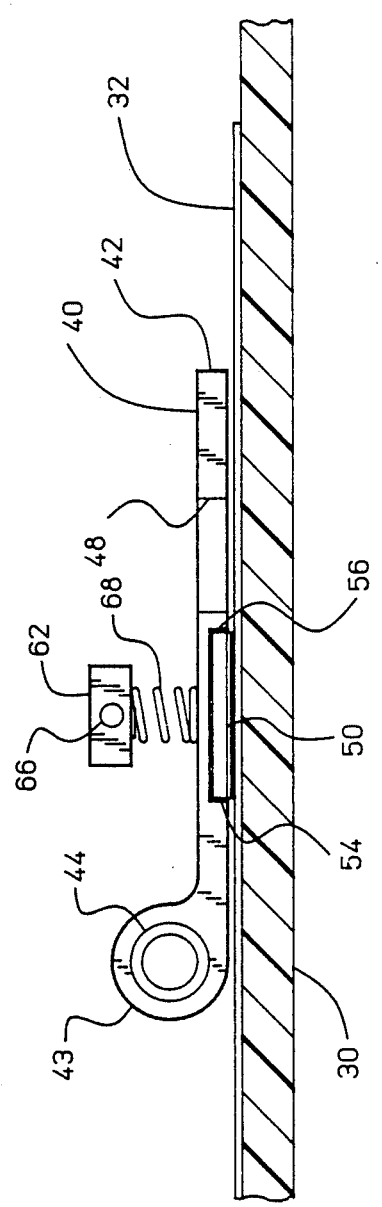

WHEEL SUPPORTED CARRIAGE FOR A SCANNING PLOTTER

BACKGROUND OF THE INVENTION AND PRIOR ART

The present invention relates to the field of computer driven plotters, particularly, scanning ink jet plotters in which a carriage having one or several ink jet devices thereon is supported above the paper or other medium on which plotting is to take place and moves transversely to the path of movement of the paper or other medium.

To obtain high resolution from an ink jet plotter, it is necessary to maintain a substantially constant vertical spacing between the ink jets and the drafting surface. To avoid smearing the ink, the means for supporting the carriage should not contact the plotted surface and contact of the carriage with the paper or other medium on which plotting takes place should be minimized. The prior art achieves this by slidably supporting the carriage on a support rod which is arranged transversely to the direction of movement of the paper. A single follower wheel, spring biased into engagement with a transversely extending guide surface disposed above the paper or other print medium prevents the carriage from pivoting about the slider rod on which it is mounted. The device maintains a substantially constant spacing of the printer head above the platen but does not automatically compensate for different paper widths or thicknesses since the single follower wheel does not ride on the paper. See, for example, U.S. Pat. No. 4,755,836 issued July 12, 1988 to the assignee of the present invention.

Slight vertical bowing or waves in the paper as it passes through the plotter and/or vertical bouncing of the carriage as it moves transversely of the paper on the support rods necessarily results in slight variation in the vertical spacing between the plotting ink jets and the paper surface with resulting unevenness of plotting quality. It is accordingly the object of the present invention to provide a means of maintaining a more constant spacing between the ink jets and the paper surface so as to improve the resolution of the plotted lines.

SUMMARY OF THE INVENTION

The present invention accordingly provides a plotter head carriage for an ink jet plotter in which the carriage is mounted above a drafting medium support surface on a slider rod for movement transversely to the path of movement of a medium on which drafting is to take place, said carriage comprising:

(a) a rigid carriage member;

(b) bearing means on said carriage member for receiving an elongated support rod on which said carriage is to be partially supported for sliding movement in the direction of said support rod and for pivotal movement of said carriage member about said support rod;

(c) at least two rolling supports mounted in bearings on said carriage member for rotation about spaced parallel axes disposed perpendicular to said support rod; and (d) means on said carriage member for mounting at least one ink jet plotting head thereon between said spaced axes.

BRIEF DESCRIPTION OF THE DRAWING

In the drawings wherein like reference numerals designate like parts:

FIG. 2 is a front view of the carriage of FIG. 1;

FIG. 3 is a left hand elevation view of the carriage shown in FIG. 1; and

DESCRIPTION OF THE PREFERRED EMBODIMENT

Figure 1:
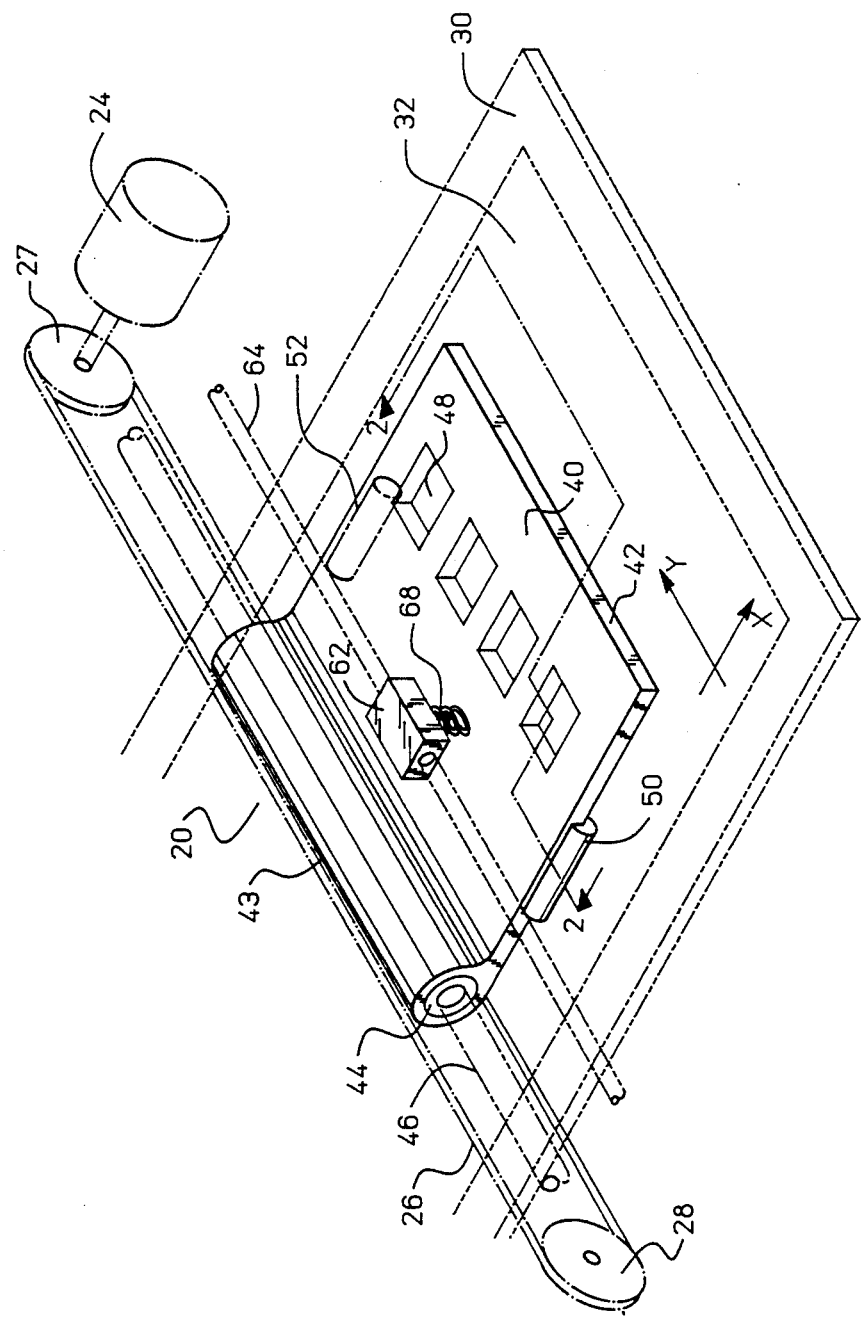
FIG. 1 is a perspective view of a roller supported carriage.

FIG. 1 comprises a perspective view of a portion of a computer driven plotter printer which has a transversely movable carriage supported above a paper table 30 on which paper 32 is caused to move in the direction of the X axis as shown by paper drive means, not shown. A suitable paper drive mechanism is shown in U.S. Pat. No. 4,716,420 granted December 29. 1987, Glassett.

Carriage 20 is moved in the Y axis direction transversely to the direction of movement of the paper 32 by a carriage drive comprising a computer controlled reversible motor 24 and a looped drive belt 26 having each of its ends connected to the carriage. Belt 26 is trained around a drive pulley 27 and an idler pulley 28 respectively located at opposite transverse sides of the paper table. The carriage drive mechanism forms no part of the present invention and it will be appreciated by persons skilled in the art that alternative forms of carriage drive can be used if desired.

Carriage 20 is comprised of a generally planar rectangular portion 40 which terminates in the front 42 of the carriage. An enlarged generally cylindrical portion 43 at the rear upper part of the carriage receives a tubular bearing 44 for supporting the rear portion of the carriage from a transversely extending support rod 46 of the plotter. Carriage 20 is thereby permitted to slide along the support rod 46 and to pivotally move around the axis of the support rod 46 to a slight extent.

The planar rectangular portion 40 of the carriage 20 is provided with a plurality of apertures 48 which provide mounting locations for ink jetting devices 15 seen in phantom in FIG. 2 which each have a plurality of ink jetting nozzles intended to be maintained at a constant distance referred to as the Z axis above the paper 32 or other medium on which plotting is to take place.

To maintain a substantially constant distance between the ink jetting nozzles and the paper 32, the planar rectangular portion 40 of the carriage is supported by a pair of support rollers 50, 52, each of which are mounted in roller bearings 54, 56 at opposite ends of the rollers 50, 52. The axes of rotation of the support rollers 50, 52 are oriented in the X direction, i.e., arranged parallel to the direction of movement of the paper and thus are perpendicular to the axis of the support rod 46. As shown, support rollers 50, 52 are placed, in the X direction, between the apertures 48 and the tubular bearing 44 whereby the rollers only contact those portions of the paper 32 prior to movement of those portions of the paper beneath the ink jets 15.

Although not essential, a relatively firm engagement of the rollers 50, 52 with the paper 32 and, hence, a more constant spacing of the ink jets above the paper 32, may be obtained by providing a spring biasing mechanism for carriage 20. The presently preferred form of spring biasing mechanism comprises a slider block 62 disposed above planar carriage portion 40 and a compression spring 68 having a lower end affixed to carriage portion 40 and its upper end affixed to the slider block 62. Slider block 62 has a transversely extending aperture 66 for reception of a transversely extending spring slider rod 64 which may be affixed to the plotter above carriage portion 40. Thus, as carriage 20 moves transversely across the paper 32, spring 68 urges the carriage portion 40 and affixed support rollers 50, 52 firmly against the plotting surface so as to maintain constant spacing between the ink jets 15 and the paper 32.

During movement of the carriage 20 to the extreme left or right hand portion of the plotting area, it is contemplated that the roller 50 or the roller 52 may move off of the edge of the paper and roll directly on the table 30 rather than on the paper 32. This would ordinarily be expected to cause a slight variation in the spacing of the ink jets 15 above the paper 32 but in practice it has been found that the use of a pair of spaced rollers 50, 52 insures that at least one roller is always on the paper 32 whereby substantially constant spacing between the ink jets 15 and paper 32 is achieved. Although, as shown, rollers 50, 52 are positioned at the extreme left and right hand lateral edges of the carriage 20, it will be appreciated that placement of the roller supports 50, 52 need not be at the extreme outer edges of the carriage 20 and that an arrangement can be designed in which neither of the rollers 50, 52 ever passes off of the edge of the paper 32. For stability of the carriage and maintenance of the substantially constant vertical spacing between the ink jets 15 and the paper 32, it has been found that a pair of transversely spaced rollers 50, 52 is essential rather than a single centrally placed roller or wheel.

Figure 4:
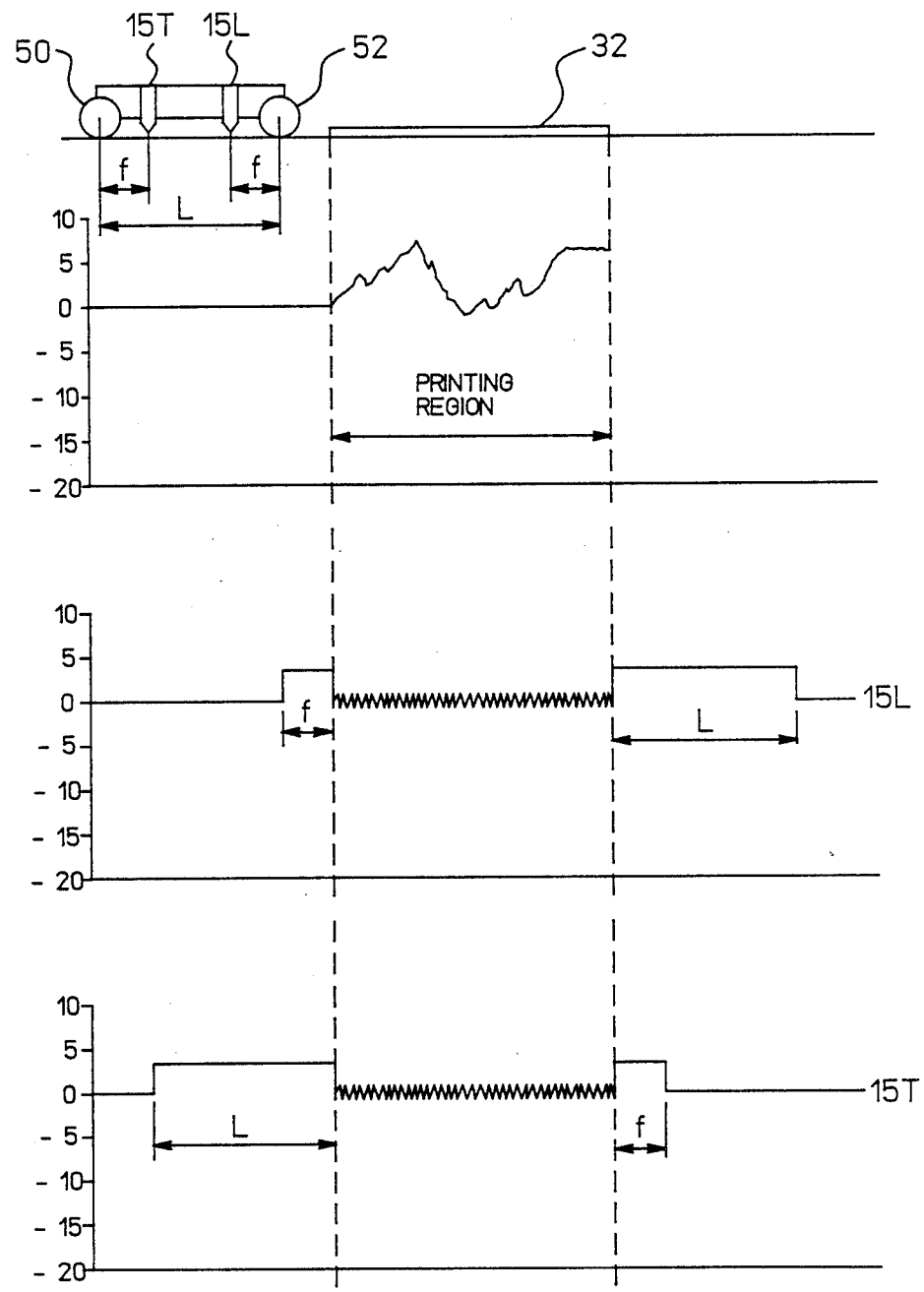
FIG. 4 is a schematic and graphs relating the vertical spacing of ink jets above the surface therebelow against the transverse carriage position.

FIG. 4 shows various plots of the vertical spacing in mils of the ink jets 15 above the surface immediately therebelow vs. the transverse position of the carriage 20 as it traverses from side to side. The zero or desired position on the vertical (Z) axis is 20 mils above the surface contacting point of the rollers 50, 52.

The top plot in FIG. 4 shows the variation of ink jet height above the platen or paper or other printing medium for a carriage without followers. As can be seen, the ink jet elevation may vary from the desired nominal position to about 5 mils below the desired elevation to about 10 mils above the desired elevation for a total peak to peak deviance of about 15 mils.

Pursuant to the invention, a carriage 20 with leading and trailing ink jets 15 L and 15 T traverses the paper from left to right. More than two ink jets may be employed but only two are shown in FIG. 4 for ease of illustration. The carriage support rollers 50, 52 are spaced apart a distance L and the ink jets 15 are each spaced a distance f from the closest roller. Lead roller 52 upon reaching the edge of the paper raises the carriage 20 such that the lead ink jet 15 L is spaced above the platen surface 20 mils plus the paper thickness for a distance f and then is 20 mils above the paper surface at all positions in the printing region. When lead roller 52 reaches the left hand edge of the paper, leading ink jet 15 L is spaced a distance f to the left of the left hand paper edge and trailing ink jet 15 T is spaced a distance L from the paper edge. After jet 15 L passes the right edge of the paper and until the trailing roller 50 drops off of the right hand edge of the paper, the elevation of lead ink jet 15 L above the platen surface for the distance L is about 20 mils plus the thickness of the paper. Similarly, the trailing jet 15 T remains the same elevation for the distance f. The path of travel of the jets 15 L and 15 T is shown in the lower portions of FIG. 4 as indicated such that the elevation of each jet 15 above the paper surface is about 20 mils through the entire printing region.

The peak to peak deviance of the plot of the ink jets above the paper in the printing region has been found to be about 2 mils for a roller supported carriage without spring biasing. The deviation may be reduced by a factor of about 25% to about 1.5 mills if a spring bias is employed.

It can thus be seen that the preferred arrangement of wheel supported carriage with biasing springs further improves the maintenance of a constant spacing between ink jets and paper as compared with a roller supported carriage without biasing springs. Resolution of the plotted lines is substantially enhanced as compared with the prior art.

Persons skilled in the art will readily appreciate that various modifications can be made from the preferred embodiment as disclosed and that the scope of protection is intended to be defined only by the limitations of the appended claims.

I claim:

1. A plotter head carriage for an ink jet plotter in which the carriage is mounted above a drafting medium support surface on a slider rod for movement transversely to the path of movement of a medium on which drafting is to take place, said carriage comprising:
    (a) a rigid carriage member;
    (b) bearing means on said carriage member for receiving an elongated support rod on which said carriage is to be partially supported for sliding movement in the direction of said support rod and for pivotal movement of said carriage member about said support rod;
    (c) at least two rolling supports mounted in bearings on said carriage member for rotation about spaced parallel axes disposed perpendicular to said support rod, at least one of said supports being in rolling contact with the paper or other medium upon which printing is to take place during the printing operation; and
    (d) means on said carriage member for mounting at least one ink jet plotting head thereon between said spaced axes, and said rolling supports being disposed on said carriage member between said support rod and said means for mounting said at least one ink jet plotting head.

2. The carriage of claim 1, further comprising means for biasing said carriage member for pivotal movement around said support rod in a direction to urge said rolling supports toward the plotting surface.

3. The carriage of claim 2, wherein said means for biasing comprises a spring slider rod mountable on said plotter parallel to said carriage support rod, a slider block mounted for sliding movement along said spring slider rod as said carriage member slides along said support rod and a spring affixed to said carriage member and to said slider block.

4. The carriage of claim 3, wherein said spring is a compression spring.

* * * * *